US012744385B2

(12) United States Patent
Navarro et al.

(10) Patent No.: US 12,744,385 B2
(45) Date of Patent: Sep. 22, 2026

(54) ENERGY STORAGE GRID INTERACTIVE INVERTER WITH VARIABLE AUTONOMOUS MODE

(71) Applicant: Eaton Intelligent Power Limited, Dublin (IE)

(72) Inventors: George Arthur Navarro, Raleigh, NC (US); Vincent Edward Wilder, Benson, NC (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/174,912

(22) Filed: Feb. 27, 2023

(65) Prior Publication Data

US 2024/0291276 A1 Aug. 29, 2024

Related U.S. Application Data

(60) Provisional application No. 63/314,528, filed on Feb. 28, 2022.

(51) Int. Cl.

*H02J 3/32* (2026.01)
*H02J 7/94* (2026.01)
*H02J 7/96* (2026.01)
*H02J 9/06* (2006.01)

(52) U.S. Cl.

CPC .................................... *H02J 3/32* (2013.01); *H02J 7/94* (2026.01); *H02J 7/96* (2026.01); *H02J 9/062* (2013.01); *H02J 2207/20* (2020.01)

(58) Field of Classification Search

CPC ........ H02J 3/28; H02J 3/32; H02J 3/38; H02J 9/00; H02J 9/062

See application file for complete search history.

(56) References Cited

U.S. PATENT DOCUMENTS 6,191,500 B1 * 2/2001 Toy .......................... H02J 3/46 307/64
2015/0005975 A1 * 1/2015 Di Cristofaro ....... H02J 7/1492 700/297
2017/0070074 A1 * 3/2017 Sugeno .................. H02J 9/062
2020/0274367 A1 * 8/2020 Navarro .................... H02J 3/28
2022/0216726 A1 * 7/2022 Kamalasadan ......... H02J 9/062

FOREIGN PATENT DOCUMENTS

WO 2020236826 A1 11/2020

OTHER PUBLICATIONS

Notification of Transmittal of the International Search Report and the Written Opinion of the International Searching Authority, or the Declaration, PCT/EP2023/025088, Jun. 6, 2023.

* cited by examiner

*Primary Examiner* — Rexford N Barnie
*Assistant Examiner* — Rasem Mourad
(74) *Attorney, Agent, or Firm* — Stanek Lemon Crouse & Meeks, PA

(57) ABSTRACT

An energy storage inverter coupled to an electric grid is provided. The energy storage inverter includes a grid interactive inverter coupled to the electric grid; a plurality of battery packs coupled to the grid interactive inverter; and one or more auxiliary loads coupled to the grid interactive inverter. The energy storage inverter provides reliable power to the one or more auxiliary loads utilizing the plurality of battery packs.

9 Claims, 4 Drawing Sheets

ENERGY STORAGE GRID INTERACTIVE INVERTER WITH VARIABLE AUTONOMOUS MODE

CLAIM OF PRIORITY

The present application claims the benefit of and priority to U.S. Provisional Application No. 63/314,528, filed on Feb. 28, 2022, entitled Energy Storage Grid Interactive Inverter with Variable Autonomous Mode, the content of which is hereby incorporated herein by reference as if set forth in its entirety.

FIELD

The present inventive concept relates to utility grid interactive inverters and, more particularly, to methods of balancing and isolating loads connected thereto.

BACKGROUND

An interconnected network for electricity delivery from "producers" to "consumers" is called and electric grid. Electric grids vary in size and can cover whole countries or continents. The grid may include, for example, power stations often located near energy and away from heavily populated areas; electrical substations to step voltage up or down; electric power transmission to carry power long distance and electrical power distribution to individual customers, where voltage is stepped down again to the required service voltage(s).

In United States, Regional Transmission Organizations (RTOs) like, for example, Pennsylvania, New Jersey, and Maryland (PJM) and Independent System Operators (ISOs) like, for example, California ISO (CAISO), coordinate, control, and monitor a multi-state electric grid. Using the data obtained from the monitoring system, these organization run an Automatic Generation Control (AGC) algorithm that helps decide on actions that increase stability of electric grid.

In particular, AGC is a system for adjusting the power output of multiple generators at different power plants in response to changes in the load, i.e. a component or portion of a circuit that consumes power ("consumer"). Since the electric grid requires that production of the grid and consumption by the load closely balance moment by moment, frequent adjustments to the output of generators are necessary.

To help maintain balance, utility-interactive inverters are provided to export power to the grid (export AC current) when the inverters are connected to the grid and generally only when the grid is within specific voltage and frequency limits.

SUMMARY

Some embodiments of the present inventive concept provide an energy storage inverter coupled to an electric grid. The energy storage inverter includes a grid interactive inverter coupled to the electric grid; a plurality of battery packs coupled to the grid interactive inverter; and one or more auxiliary loads coupled to the grid interactive inverter. The energy storage inverter provides reliable power to the one or more auxiliary loads utilizing the plurality of battery packs.

In further embodiments, each of the plurality of battery packs include a plurality of lithium ion batteries.

In still further embodiments, the grid interactive inverter may regulate power to and from the electric grid.

In some embodiments, the energy storage inverter may operate in one of three modes: a first autonomous mode where all power for the one or more auxiliary loads is provided by the energy storage inverter; a second variable autonomous mode where the energy storage inverter is grid interactive and draws power from the plurality of battery packs and wherein the one or more auxiliary loads are provided power and isolated from operations at the electric grid; and a third test mode where the energy storage inverter only draws power from the electric grid.

In further embodiments, during the second variable autonomous mode the one or more auxiliary loads may be isolated from over voltage.

In still further embodiments, the critical auxiliary loads may include cooling fans or systems and communications systems and these critical auxiliary loads may always receive power during an outage experienced by the electric grid.

In some embodiments, the third test mode may be used to test devices and systems that are part of the one or more auxiliary loads.

In further embodiments, during the third test mode, power from the electric grid may be used to test the devices and systems that are part of the one or more auxiliary loads.

In still further embodiments, the energy storage inverter provides standby backup battery power, energy storage and balance of energy distribution.

Related methods are also provided herein.

DETAILED DESCRIPTION OF EMBODIMENTS

Figure 1:
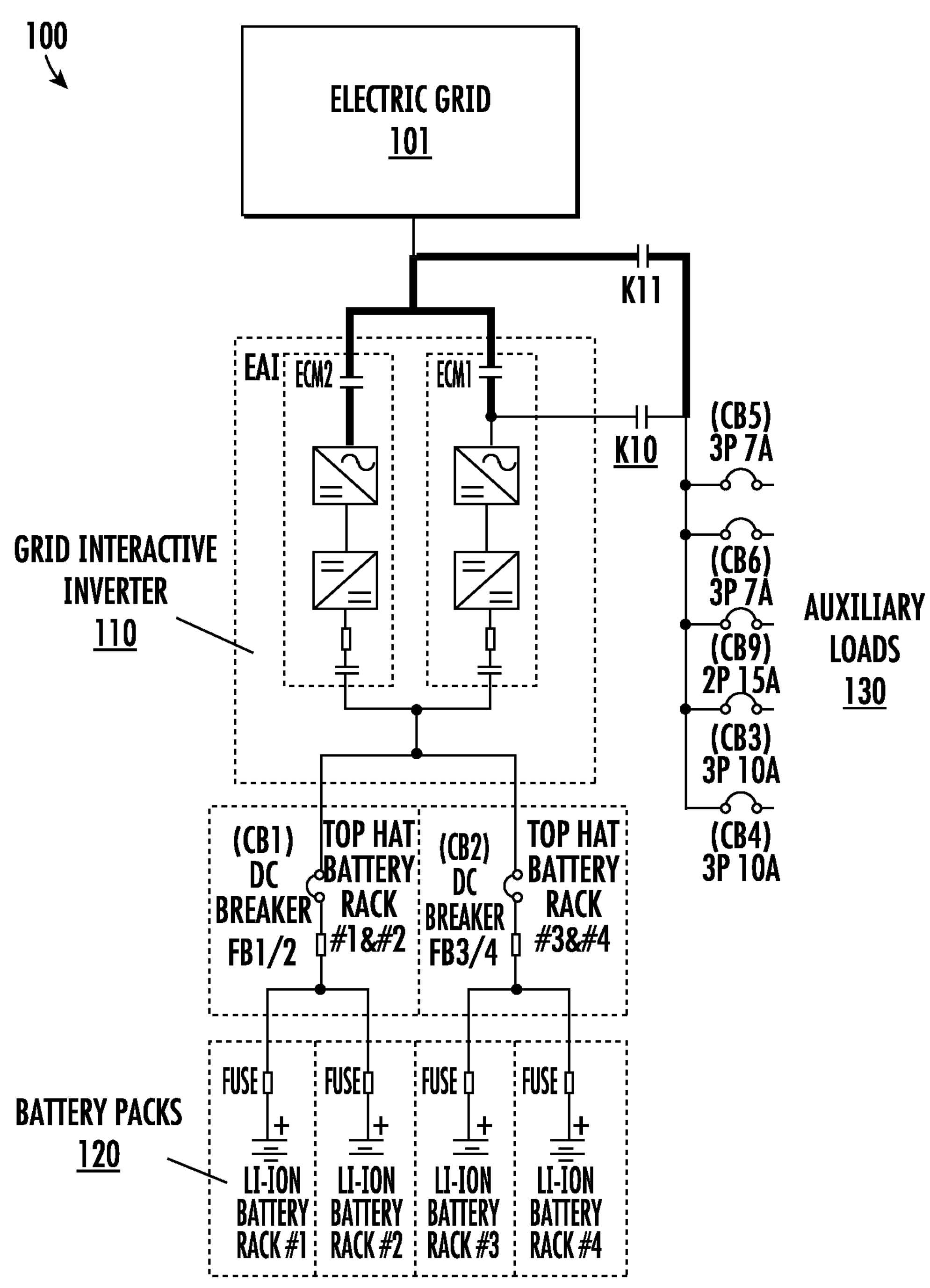
FIG. 1 is a diagram illustrating a first mode of an energy storage grid in accordance with some embodiments of the present inventive concept.

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items. Similarly, as used herein, the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Reference will now be made in detail in various and alternative example embodiments and to the accompanying figures. Each example embodiment is provided by way of explanation, and not as a limitation. It will be apparent to those skilled in the art that modifications and variations can be made without departing from the scope or spirit of the disclosure and claims. For instance, features illustrated or described as part of one embodiment may be used in connection with another embodiment to yield a still further embodiment. Thus, it is intended that the present disclosure includes modifications and variations that come within the scope of the appended claims and their equivalents.

As discussed above, utility-interactive inverters are provided to export power to the grid (export AC current) when the inverters are connected to the grid and generally only when the grid is within specific voltage and frequency limits. These interactive inverters may be subjected to diverse, and sometimes extreme, utility grid voltage conditions that place power quality demands and challenges to auxiliary loads that generally must remain powered up in order to fulfill the grid support and resiliency expectations. For example, the auxiliary loads may include cooling systems for equipment stored in data racks. If the power to these cooling systems is lost, the equipment may overheat and possibly cause hazardous events, such as fires. Thus, it is extremely important to maintain power for the auxiliary loads and isolate these loads from fluctuations and/or instability in the electric grid. Accordingly, some embodiments of the present inventive concept provide methods and systems that deliberately isolate and backup auxiliary loads, while improving power quality.

As used herein, "auxiliary loads" refer to power supplies and other critical systems and controls powered by these power supplies including logic and communications. However, embodiments of the present inventive concept are not limited thereto. As discussed above, the auxiliary loads may include cooling systems, such as fans, and communication systems and logic.

Conventionally, power distribution systems for electronic and electromechanical equipment in industrial facilities, data centers and other applications commonly use AC power distribution networks in which utility power is distributed via power distribution units (PDUs) to branch circuits, which, in turn, provide power to loads such as server racks, HVAC equipment, and the like. Continuous power may be provided by incorporating local diesel or natural gas powered engine-generator sets and uninterruptible power supply (UPS) systems that provide backup power from batteries, capacitor banks, fuel cells and similar devices. Some power distribution systems may also support provision of power from alternative energy sources, such as photovoltaic (PV) arrays. Such auxiliary and alternative power sources may require the use of inverters to interface to the AC power distribution system.

Some embodiments of the present inventive concept extend the conventional use of a grid interactive inverter in combination with battery packs of, for example, a UPS, to provide not only standby backup battery power, but energy storage and balance of energy distribution. Thus, embodiments of the present inventive concept provide a UPS that functions as an energy storage inverter as will be discussed further herein.

For data center operators, UPSs have long represented a critical safeguard against potentially damaging power anomalies, as well as vital battery backup to ensure business continuity during an unexpected power outage. Yet thanks to new technology, data center UPSs now have the capability to achieve a dual benefit, transforming from a load on the grid to a value-generating asset.

Most large-scale data centers have deployed substantial battery banks to provide adequate backup in the event of a blackout. Yet the reality is, these batteries sit unused the vast majority of the time because power outages occur infrequently. Operators in today's hyperscale, multi-tenant and other large data centers now have the opportunity to leverage this underutilized asset, turning their UPS into a profit center and supporting the grid as a distributed energy resource (DER).

The use of lithium-ion batteries, which offer a longer lifespan and eight times the cycle rate of traditional value regulated lead-acid (VRLA batteries), provides the potential for this evolution of the traditional UPS. While the data center maintains control of its energy, choosing how much capacity to offer and when, it has the ability to convert the traditional power backup into an energy storage device, providing a range of benefits to operators seeking to lower energy bills and optimize consumption.

Figure 2:
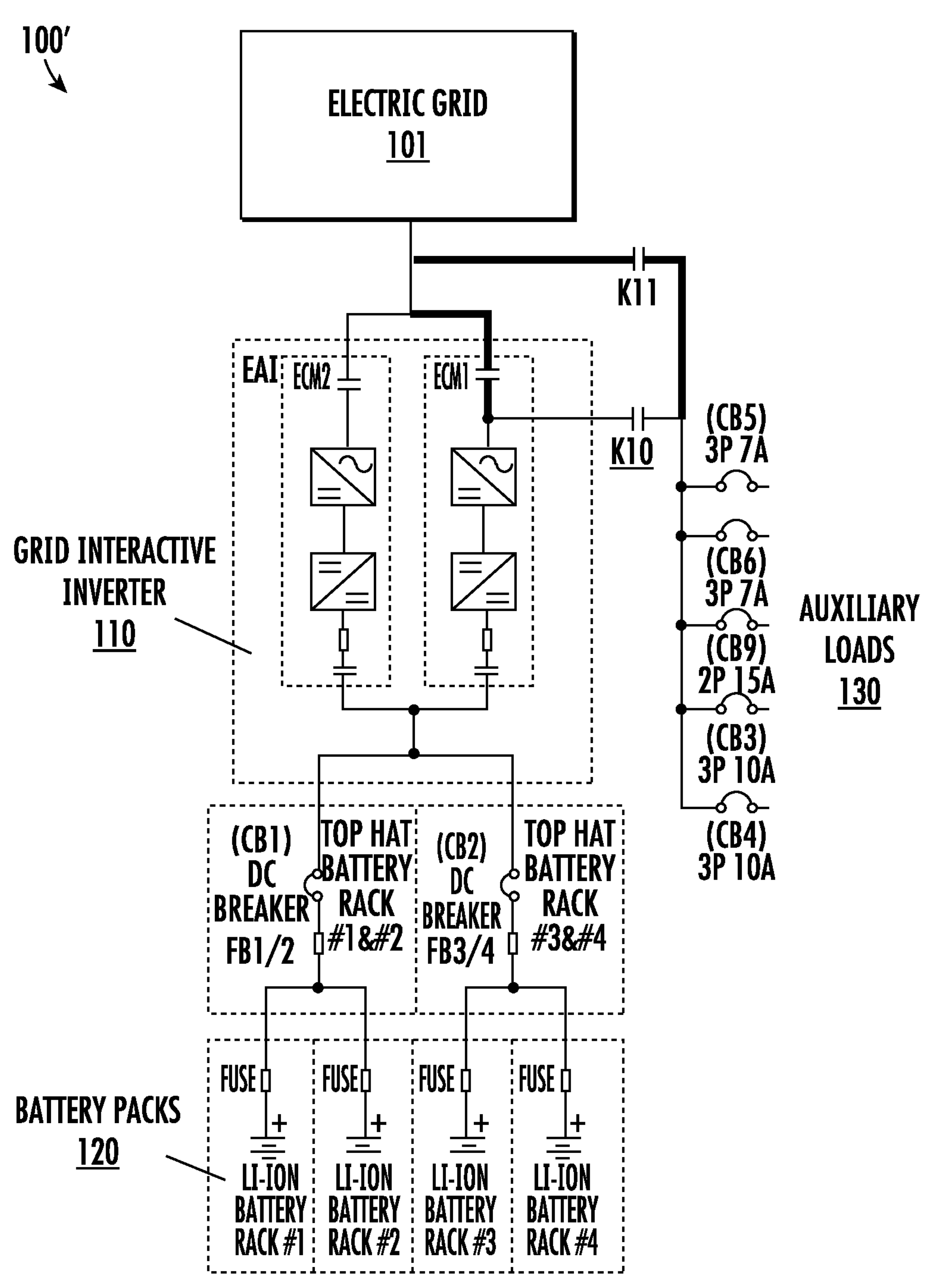
FIG. 2 is a diagram illustrating a second mode of an energy storage grid in accordance with some embodiments of the present inventive concept.
Figure 3:
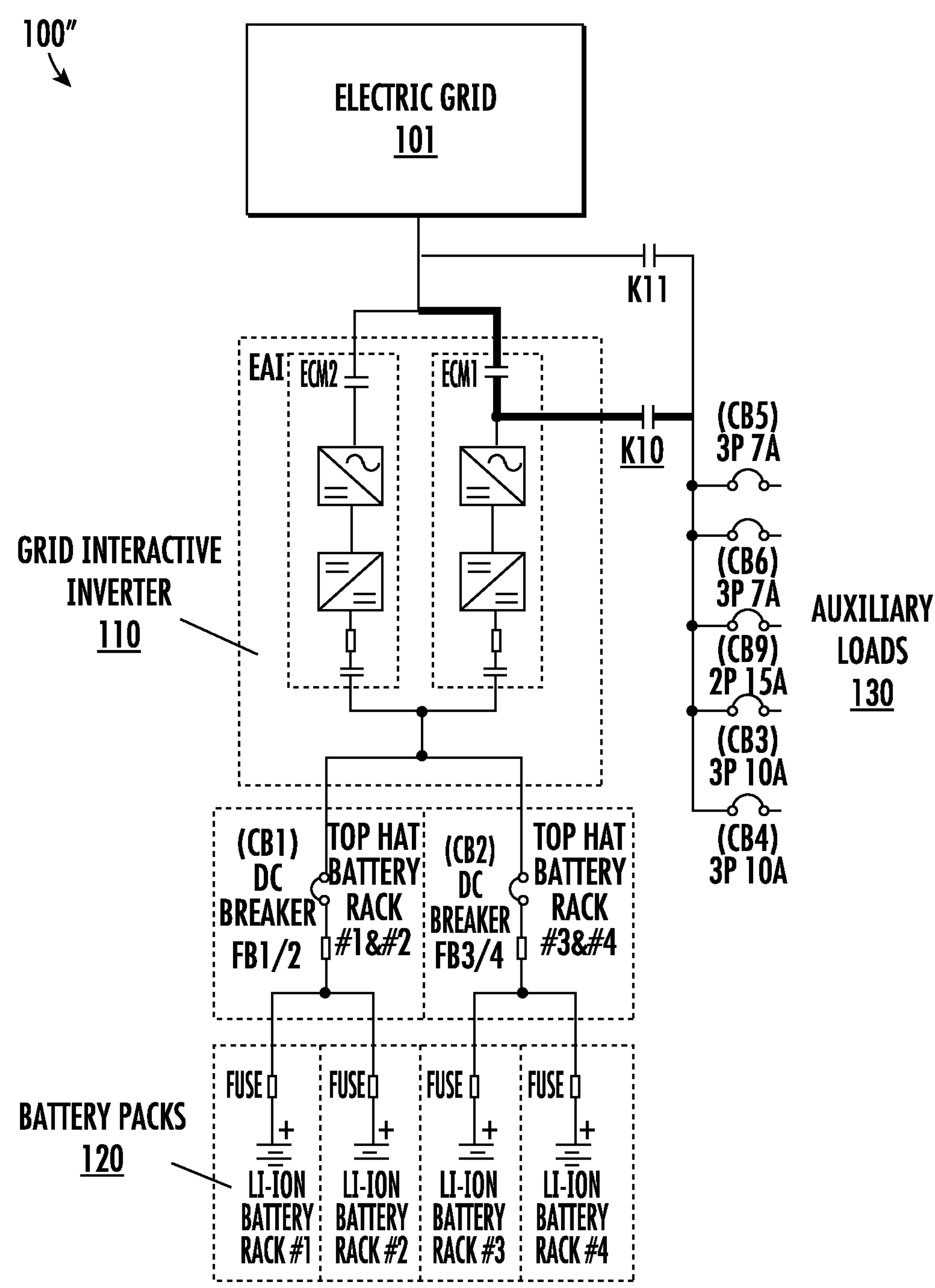
FIG. 3 is a diagram illustrating a third mode of an energy storage grid in accordance with some embodiments of the present inventive concept.

FIGS. 1, 2 and 3 illustrate energy storage inverters 100, 100' and 100" in accordance with some embodiments of the present inventive concept. Each of these figures illustrates a different state/mode of the energy storage inverter 100, which will be discussed in turn below. As will be discussed, the "mode" in which the energy storage inverter 100 operates may be based on information received from the electric grid, for example, a voltage indicating a state of the power grid. Embodiments of the present inventive concept may receive information about the electric grid and automatically adjust characteristics of the energy storage inverter 100 to maintain power to the auxiliary loads 130 and isolate these loads 130 from unfavorable conditions in the electric grid 101. Although only three modes are discussed, it will be understood that the energy storage inverter may operate in more than three modes without departing from the scope of the present inventive concept.

Referring now to FIG. 1, an energy storage inverter 100 in accordance with some embodiments of the present inventive concept will be discussed. As illustrated energy storage inverter 100 includes a plurality of battery packs 120 coupled to the grid interactive inverter 110, which is coupled to the electric grid 201. The energy storage inverter 100 may be used to provide power to the auxiliary loads 130. The energy storage inverter 100 is grid connected, but it provides reliable UPS like behavior that includes mission critical power to the auxiliary loads 130.

The battery packs 120 may include a plurality of lithium ion batteries, which, as discussed above, provide eight times the cycle rate of traditional VRLA batteries. The grid interactive inverter 110 helps regulate power to and from the grid 101. The mode illustrated in FIG. 1 illustrates a state of the energy storage inverter 100 where power is not being provided or taken from the electric grid 101. Thus, the solid lines of FIG. 1 are used to indicate an open circuit, no electricity is flowing through these lines. All the power for the auxiliary loads 130 is provided from the energy storage inverter 100 and, thus, the energy storage inverter 100 is operating in an "autonomous mode."

Referring now to FIG. 2, a second mode of the energy storage inverter 100' will be discussed. As illustrated by the solid lines of FIG. 2, in this embodiment, the energy storage inverter 100' is still grid interactive. This mode may be referred to as a "variable autonomous mode" of the energy storage inverter 100'. The auxiliary loads 130, for example, cooling fans, communications and logic power, are supplied power so that these critical systems do not shut down or burn up. The inverter, K10, path keeps things running where voltages are both abnormally high or abnormally low. The configuration illustrated in FIG. 2 may be used in situations where, for example, the output voltage is low or high, during a battery test, battery SOC management, critical auxiliary load and the like. Critical auxiliary loads include loads such as cooling and communications, applications that must always receive power in the presence of the outage. The load may be isolated so that is it protected from over voltage but still grid interactive Referring now to FIG. 3, a third mode of the energy storage inverter 100" will be discussed. As illustrated by the solid lines of FIG. 3, in this embodiment, the energy storage inverter 100" is only grid interactive. This mode may be referred to as a "test mode" or "service mode" of the energy storage inverter 100". The power from the electric grid 101/utility is used to test the various devices and systems that make up the auxiliary loads 130. In other words, the batteries 120 are not being used.

Figure 4:
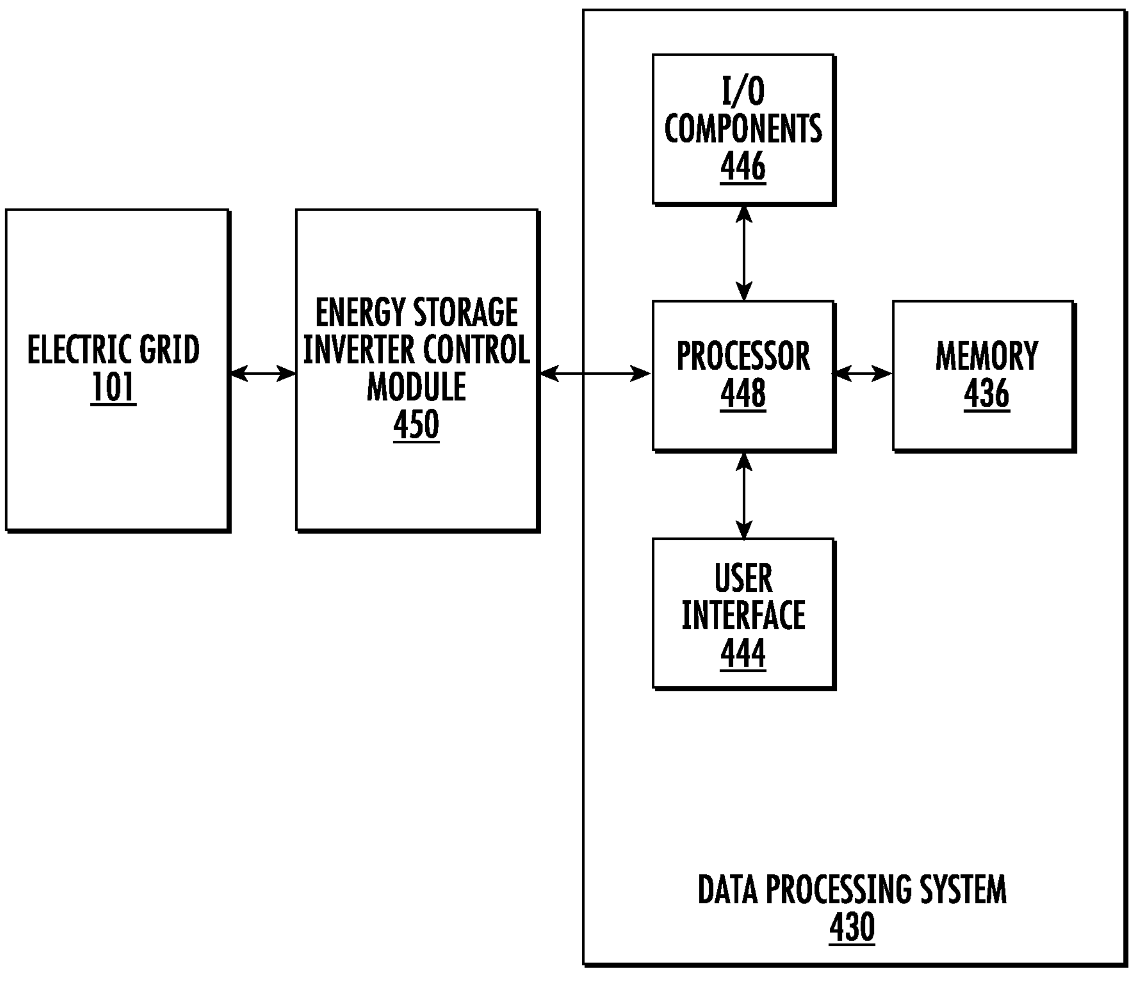
FIG. 4 is a block diagram of a data processing system for use in accordance with some embodiments of the present inventive concept.

As is clear from the details of the present inventive concept, embodiments of the present inventive concept require data processing. Referring now to FIG. 4, an example of a data processing system 430 suitable for use with any of the examples described above will be discussed. Although the example data processing system 430 is shown as in communication with the energy storage inverter control module 450 in communication with the electric grid 101 in accordance with embodiments of the present inventive concept, the data processing system 430 may be part of any component of the system without departing from the scope of the present inventive concept. In some examples, the data processing system 430 can be any suitable computing device for performing operations according to the embodiments discussed herein described herein. The energy storage inverter control module 450 receives signals from the electric grid 101 and automatically selects the mode of the energy storage inverter 100 in accordance with the received signals.

As illustrated, the data processing system 430 includes a processor 448 communicatively coupled to I/O components 446, a user interface 444 and a memory 436. The processor 448 can include one or more commercially available processors, embedded processors, secure processors, microprocessors, dual microprocessors, multi-core processors, other multi-processor architectures, another suitable processing device, or any combination of these. The memory 436, which can be any suitable tangible (and non-transitory) computer-readable medium such as random access memory (RAM), read-only memory (ROM), erasable and electronically programmable read-only memory (EEPROMs), or the like, embodies program components that configure operation of the data processing system 430.

I/O components 446 may be used to facilitate wired or wireless connections to devices such as one or more displays, game controllers, keyboards, mice, joysticks, cameras, buttons, speakers, microphones and/or other hardware used to input or output data. Memory 736 represents nonvolatile storages such as magnetic, optical, or other storage media included in the data processing system and/or coupled to processor 448.

The user interface 444 may include, for example, a keyboard, keypad, touchpad, voice activation circuit, display or the like and the processor 448 may execute program code or instructions stored in memory 436.

It should be appreciated that data processing system 430 may also include additional processors, additional storage, and a computer-readable medium (not shown). The processor(s) 448 may execute additional computer-executable program instructions stored in memory 436. Such processors may include a microprocessor, digital signal processor, application-specific integrated circuit, field programmable gate arrays, programmable interrupt controllers, programmable logic devices, programmable read-only memories, electronically programmable read-only memories, or other similar devices.

As discussed briefly above, some embodiments of the present inventive concept provide an energy storage inverter that operates in various modes to both support and isolate auxiliary loads connected thereto. Energy storage inverters in accordance with embodiments discussed herein may help provide balance to critical loads.

The aforementioned flow logic and/or methods show the functionality and operation of various services and applications described herein. If embodied in software, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as a processor in a computer system or other system. The machine code may be converted from the source code, etc. Other suitable types of code include compiled code, interpreted code, executable code, static code, dynamic code, object-oriented code, visual code, and the like. The examples are not limited in this context.

If embodied in hardware, each block may represent a circuit or a number of interconnected circuits to implement the specified logical function(s). A circuit can include any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Qualcomm® Snapdragon®; Intel® Celeron®, Core (2) Duo®, Core i3, Core i5, Core i7, Itanium®, Pentium®, Xeon®, Atom® and XScale® processors; and similar processors. Other types of multi-core processors and other multi-processor architectures may also be employed as part of the circuitry. According to some examples, circuitry may also include an application specific integrated circuit (ASIC) or a field programmable gate array (FPGA), and modules may be implemented as hardware elements of the ASIC or the FPGA. Further, embodiments may be provided in the form of a chip, chipset or package.

Although the aforementioned flow logic and/or methods each show a specific order of execution, it is understood that the order of execution may differ from that which is depicted. Also, operations shown in succession in the flowcharts may be able to be executed concurrently or with partial concurrence. Further, in some embodiments, one or more of the operations may be skipped or omitted. In addition, any number of counters, state variables, warning semaphores, or messages might be added to the logical flows or methods described herein, for purposes of enhanced utility, accounting, performance measurement, or providing troubleshooting aids, etc. It is understood that all such variations are within the scope of the present disclosure. Moreover, not all operations illustrated in a flow logic or method may be required for a novel implementation.

Where any operation or component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages. Software components are stored in a memory and are executable by a processor. In this respect, the term "executable" means a program file that is in a form that can ultimately be run by a processor. Examples of executable programs may be, for example, a compiled program that can be translated into machine code in a format that can be loaded into a random access portion of a memory and run by a processor, source code that may be expressed in proper format such as object code that is capable of being loaded into a random access portion of a memory and executed by a processor, or source code that may be interpreted by another executable program to generate instructions in a random access portion of a memory to be executed by a processor, etc. An executable program may be stored in any portion or component of a memory. In the context of the present disclosure, a "computer-readable medium" can be any medium (e.g., memory) that can contain, store, or maintain the logic or application described herein for use by or in connection with the instruction execution system.

A memory is defined herein as an article of manufacture and including volatile and/or non-volatile memory, removable and/or non-removable memory, erasable and/or non-erasable memory, writeable and/or re-writeable memory, and so forth. Volatile components are those that do not retain data values upon loss of power. Nonvolatile components are those that retain data upon a loss of power. Thus, a memory may include, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may include, for example, static random access memory (SRAM), dynamic random access memory (DRAM), or magnetic random access memory (MRAM) and other such devices. The ROM may include, for example, a programmable read-only memory (PROM), an erasable programmable read-only memory (EPROM), an electrically erasable programmable read-only memory (EEPROM), or other like memory device.

The devices described herein may include multiple processors and multiple memories that operate in parallel processing circuits, respectively. In such a case, a local interface, such as a communication bus, may facilitate communication between any two of the multiple processors, between any processor and any of the memories, or between any two of the memories, etc. A local interface may include additional systems designed to coordinate this communication, including, for example, performing load balancing. A processor may be of electrical or of some other available construction.

It should be emphasized that the above-described embodiments of the present disclosure are merely possible examples of implementations set forth for a clear understanding of the principles of the disclosure. It is, of course, not possible to describe every conceivable combination of components and/or methodologies, but one of ordinary skill in the art may recognize that many further combinations and permutations are possible. That is, many variations and modifications may be made to the above-described embodiment(s) without departing substantially from the spirit and principles of the disclosure. All such modifications and variations are intended to be included herein within the scope of this disclosure and protected by the following claims.

That which is claimed is:

1. An energy storage inverter coupled to an electric grid, the energy storage inverter comprising:

a processor in communication with the energy storage inverter;

a grid interactive inverter coupled to the electric grid;

a plurality of battery packs coupled to the grid interactive inverter;

a first plurality of switches ECM1 and ECM2 between the grid interactive inverter and the electric grid;

a second plurality of switches K10 and K11 between the grid interactive inverter and one or more auxiliary loads, wherein the one or more auxiliary loads are coupled to and decoupled from the grid interactive inverter using one or more of ECM1, ECM2, K10 and K11; and wherein the energy storage inverter including the grid interactive inverter and the plurality of battery packs provides reliable power to the one or more auxiliary loads utilizing the plurality of battery packs, wherein the energy storage inverter operates in three modes; and an energy storage inverter control module in communication with the processor that selectively operates the energy storage inverter in the three modes responsive to sensed conditions of the electric grid, wherein the three modes comprise:

a first autonomous mode where all power for the one or more auxiliary loads is provided by the plurality of battery packs by opening ECM1, ECM2 and K11 coupling the grid interactive inverter to the electric grid and closing K10;

a second variable autonomous mode where the grid interactive inverter draws power from the electric grid and from the plurality of battery packs and wherein the one or more auxiliary loads are provided power and isolated from operations at the electric grid using the first and second switches to provide a path from the grid interactive inverter to the one or more auxiliary loads and wherein ECM1 and K11 are open and ECM2 and K10 are closed; and a third test mode where the one or more auxiliary loads only draw power from the electric grid to test functionality of the auxiliary loads using the first and second switches to provide a path from the electric grid to the one or more auxiliary loads, wherein ECM1 and K10 are open and ECM2 and K11 are closed.

2. The energy storage inverter of claim 1, wherein each of the plurality of battery packs include a plurality of lithium ion batteries.

3. The energy storage inverter of claim 1, wherein the grid interactive inverter regulates power to and from the electric grid.

4. The energy storage inverter of claim 1, wherein during the second variable autonomous mode the one or more auxiliary loads are isolated from over voltage using the first and second switches to define a path of current.

5. The energy storage inverter of claim 4, wherein ones of the one or more auxiliary loads are critical auxiliary loads, wherein these critical auxiliary loads include cooling fans or systems and communications systems and wherein these critical auxiliary loads always receive power during an outage experienced by the electric grid.

6. The energy storage inverter of claim 1, wherein the one or more auxiliary loads comprise one or more devices and systems and wherein the third test mode is used to test the one or more devices and systems that are part of the one or more auxiliary loads.

7. The energy storage inverter of claim 6, wherein during the third test mode, power from the electric grid is used to test the one or more devices and systems that are part of the one or more auxiliary loads.

8. The energy storage inverter of claim 1, wherein the energy storage inverter provides standby backup battery power, energy storage and balance of energy distribution.

9. The energy storage inverter of claim 1, wherein responsive to sensed conditions of the electric grid comprise voltages and currents.

* * * * *